(12) United States Patent
Furihata et al.

(10) Patent No.: US 10,495,954 B2
(45) Date of Patent: Dec. 3, 2019

(54) PROJECTOR AND METHOD FOR CONTROLLING PROJECTOR

(71) Applicant: SEIKO EPSON CORPORATION, Tokyo (JP)

(72) Inventors: Takeshi Furihata, Okaya (JP); Daisuke Yanagihara, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/437,742

(22) Filed: Feb. 21, 2017

(65) Prior Publication Data
US 2017/0285450 A1 Oct. 5, 2017

(30) Foreign Application Priority Data
Mar. 31, 2016 (JP) ................................ 2016-070419

(51) Int. Cl.
| | |
|---|---|
| *G03B 21/14* | (2006.01) |
| *G03B 21/20* | (2006.01) |
| *H04N 9/31* | (2006.01) |
| *G02B 7/14* | (2006.01) |
| *G03B 21/00* | (2006.01) |

(52) U.S. Cl.
CPC ............ *G03B 21/142* (2013.01); *G02B 7/14* (2013.01); *G03B 21/2053* (2013.01); *H04N 9/315* (2013.01); *H04N 9/3141* (2013.01); *G03B 21/006* (2013.01)

(58) Field of Classification Search
CPC . G02B 7/14; G02B 13/16; G02B 7/16; H04N 5/2254; H04N 9/3155; H04N 9/3161; H04N 9/3164; H04N 9/3194; H04N 9/3182; H04N 9/3185; H04N 9/3188; G03B 17/14; G03B 21/142; G03B 21/006; G03B 21/2053; G03B 21/145; G03B 21/2006; G03B 21/2013; G03B 21/2033; G03B 21/206
See application file for complete search history.

(56) References Cited

U.S. PATENT DOCUMENTS

| | | | |
|---|---|---|---|
| 2010/0195063 A1* | 8/2010 | Fujimaki | G03B 21/142 353/101 |
| 2011/0032489 A1* | 2/2011 | Kimoto | G03B 21/16 353/56 |

(Continued)

FOREIGN PATENT DOCUMENTS

JP 2014-137513 A 7/2014

*Primary Examiner* — Cara E Rakowski
*Assistant Examiner* — Christopher A Lamb, II
(74) *Attorney, Agent, or Firm* — Oliff PLC

(57) ABSTRACT

A projector including a light source, a power supply section, a power supply control section that controls power supply from the power supply section, a projection lens that projects an image, and a projection system driver that moves the projection lens, wherein the power supply control section performs, as power supply modes, an operation mode in which power is supplied to the light source section to allow the light source section to output light and a first standby mode in which the power supply to the light source section is terminated, and in the first standby mode, power is supplied to the projection system driver to allow the projection lens to move to an attachment/detachment position where the projection lens is attachable and detachable.

8 Claims, 6 Drawing Sheets

(56) References Cited

U.S. PATENT DOCUMENTS

| | | | | |
|---|---|---|---|---|
| 2011/0096301 A1* | 4/2011 | Koyama | ............... | G03B 21/16 |
| | | | | 353/88 |
| 2012/0086914 A1* | 4/2012 | Furihata | ............... | G03B 21/14 |
| | | | | 353/15 |
| 2014/0340655 A1* | 11/2014 | Delfs | ............... | G03B 21/2033 |
| | | | | 353/85 |

* cited by examiner

|  | OPERATION | FIRST STANDBY | SECOND STANDBY | THIRD STANDBY |
|---|---|---|---|---|
| LIGHT SOURCE / FAN | ON | OFF | OFF | OFF |
| IMAGE / VOICE PROCESSING | ALLOWED | ALLOWED | NOT ALLOWED | NOT ALLOWED |
| NETWORK COMMUNICATION | ALLOWED | ALLOWED | ALLOWED | NOT ALLOWED |
| LENS CONTROL | ALLOWED | NOT ALLOWED | NOT ALLOWED | NOT ALLOWED |
| LENS SHIFT CONTROL | ALLOWED | ALLOWED | NOT ALLOWED | NOT ALLOWED |
| STATE OF LED | ILLUMINATING | BLINKING | NOT ILLUMINATING | NOT ILLUMINATING |

FIG. 2

PROJECTOR AND METHOD FOR CONTROLLING PROJECTOR

CROSS-REFERENCE

The entire disclosure of Japanese Patent Application No. 2016-070419, filed Mar. 31, 2016 is expressly incorporated by reference herein.

BACKGROUND

1. Technical Field

The present invention relates to a projector and a method for controlling the projector.

2. Related Art

There has been a known projector of related art capable of changing a projection lens (see JP-A-2014-137513, for example).

The projector described in JP-A-2014-137513 includes a lens change detector that detects operation of attaching and detaching a lens cover or a lens unit and a controller that determines whether the lens cover or the lens unit is attached or detached on the basis of a signal from the lens change detector. When the controller determines that the lens cover or the lens unit has been detached, the operation mode is switched from a projection mode to a lens change mode, and at least a light source is powered off.

In order to lower power consumption, a projector has a plurality of power supply modes. When the projector transitions to a power supply mode in which power consumption is lowered, the projection lens cannot be moved in some cases, and in a case where the projection lens is not located in an attachment/detachment position where the projection lens can be attached and detached, the projection lens cannot be detached. In this case, to detach the projection lens from the projector, the projector needs to be restarted.

SUMMARY

An advantage of some aspects of the invention is to provide a projector and a method for controlling the projector that allow quick lens change even in a power supply mode in which power consumption of the projector is lowered.

A projector according to an aspect of the invention includes a light source, a power supply section, a power supply control section that controls power supply from the power supply section, a projection lens that projects an image, and a lens driver that moves the projection lens. The power supply control section performs a first power supply mode in which power is supplied to the light source to allow the light source to emit light and a second power supply mode in which the power supply to the light source is terminated, and in the second power supply mode, power is supplied to the lens driver to allow the projection lens to move to an attachment/detachment position where the projection lens is attachable and detachable.

According to the aspect of the invention, in the second power supply mode, in which the power supply to the light source is terminated, the projection lens can be moved to the attachment/detachment position. Therefore, even in a power supply mode for lowering power consumption of the projector, the lens can be quickly changed without restarting the projector.

In the projector having the configuration described above, a lens movement process of causing the lens driver to move the projection lens to the attachment/detachment position and causing the power supply control section to terminate the power supply from the power supply section may be allowed to be carried out.

According to the aspect of the invention with this configuration, the projection lens can be moved to the attachment/detachment position, and the power supply from the power supply section can be terminated. A projector that consumes a small amount of power can be achieved.

In the projector having the configuration described above, in the lens movement process, the power supply to the lens driver or the projector may be terminated.

According to the aspect of the invention with this configuration, in the lens movement process, the power supply to the lens driver or the projector is terminated. The projection lens can therefore be changed more safely.

The projector having the configuration described above may further include an operation accepting section that accepts operation, and when the operation accepting section accepts predetermined operation, the lens driver may move the projection lens to the attachment/detachment position.

According to the aspect of the invention with this configuration, when the operation accepting section accepts predetermined operation, the projection lens is moved to the attachment/detachment position. The projection lens can therefore be moved to the attachment/detachment position in response to a user's operation only when the user desires to change the projection lens, whereby a low-power-consumption projector with no unnecessary lens movement or power supply can be achieved.

In the projector having the configuration described above, when operation performed for at least a preset period on an operation element provided on the operation accepting section is detected, the lens driver may move the projection lens to the attachment/detachment position.

According to the aspect of the invention with this configuration, when operation performed for at least a preset period on an operation element is detected, the projection lens is moved to the attachment/detachment position. Unintended movement of the projection lens can therefore be avoided if the operation element is accidentally pressed down.

In the projector having the configuration described above, the projection lens may be a lens block including a lens and a motor that moves the lens, and a main body of the projector may include a protection element that protects the lens driver and the motor from static electricity when the projection lens is attached to the main body and the lens driver is electrically connected to the motor.

According to the aspect of the invention with this configuration, the lens driver and the motor can be protected from static electricity.

The projector having the configuration described above may have a third power supply mode in which the power supply section supplies the lens driver with no power and may further include a notification section, and in the second power supply mode, the notification section may perform notification different from notification performed in the first and third power supply modes.

According to the aspect of the invention with this configuration, when the projector transitions to the second power supply mode, notification different from notification performed in the first and third power supply modes can be performed.

A method for controlling a projector according to an aspect of the invention is a method for controlling a projector including a light source, a power supply section, a power supply control section that controls power supply from the power supply section, a projection lens that projects an image, and a lens driver that moves the projection lens, the method including causing the power supply control section to change a power supply mode to a first power supply mode in which power is supplied to the light source to allow the light source to emit light and a second power supply mode in which the power supply to the light source is terminated and, in the second power supply mode, causing the power supply control section to supply the lens driver with power to allow the projection lens to move to an attachment/detachment position where the projection lens is attachable and detachable.

According to the aspect of the invention, in the second power supply mode, in which the power supply to the light source is terminated, the projection lens can be moved to the attachment/detachment position. Therefore, even in a power supply mode for lowering power consumption of the projector, the lens can be quickly changed without restarting the projector.

BRIEF DESCRIPTION OF THE DRAWINGS

The invention will be described with reference to the accompanying drawings, wherein like numbers reference like elements.

FIG. 2 shows power supply modes provided in the projector.

DESCRIPTION OF EXEMPLARY EMBODIMENTS

An embodiment of the invention will be described below with reference to the drawings.

Figure 1:
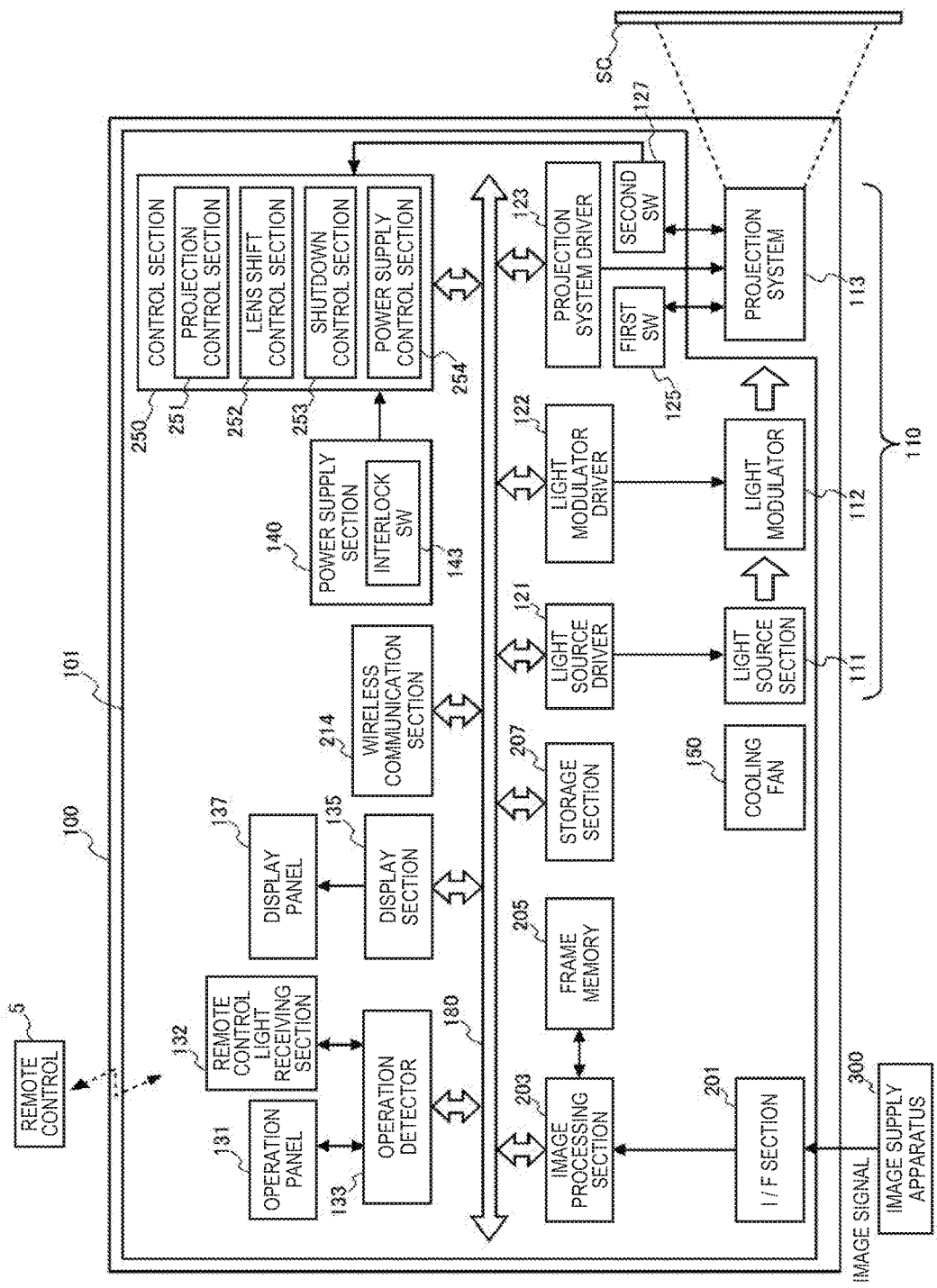
FIG. 1 is a functional block diagram showing the configuration of a projector.

FIG. 1 is a functional block diagram showing the configuration of a projector 100.

The projector 100 is connected to an external image supply apparatus 300, such as a personal computer and a variety of video players, and projects an image based on an image signal supplied from the image supply apparatus 300 on a projection target.

Examples of the image supply apparatus 300 may include a video reproduction apparatus, a DVD (digital versatile disk) reproduction apparatus, a television tuner, a CATV (cable television) set-top box, a video output apparatus, such as a video game console, and a personal computer. The projection target may be an object that is not uniformly flat, such as an exterior wall of a building, or may be an object that is uniformly flat, such as a screen SC. FIG. 1 shows a case where the projection target is the screen SC by way of example.

The projector 100 includes an interface section (interface is hereinafter abbreviated to I/F) 201 as an interface via which the projector 100 is connected to the image supply apparatus 300.

The I/F section 201 includes a connector to which a cable is connected and an I/F circuit (neither of them is shown) and receives as an input an image signal supplied from the image supply apparatus 300, which is connected to the I/F section 201 via the cable. The I/F section 201 converts the inputted image signal into image data and outputs the image data to an image processing section 203.

The interface provided in the I/F section 201 may, for example, be an interface for data communication, such as an interface that complies with Ethernet (registered trademark), IEEE1394, USB, or RS-232C. The interface of the I/F section 201 may instead be an interface for image data, such as an interface that complies with MHL (registered trademark), HDMI (registered trademark), or DisplayPort.

Still instead, the I/F section 201 may include, as the connector, a VGA terminal to which an analog image signal is inputted or a DVI (digital visual interface) terminal to which digital image data is inputted. The I/F section 201 further includes an A/D conversion circuit, and when an analog image signal is inputted via the VGA terminal, the A/D conversion circuit converts the analog image signal into image data and outputs the image data to the image processing section 203.

The projector 100 includes the following broadly classified portions: a display section 110, which forms an optical image; and an image processing system that electrically processes an image to be displayed by the display section 110. The display section 110 will first be described. The display section 110 includes a light source section 111, a light modulator 112, and a projection system 113. The light source section 111 corresponds to the "light source" in an aspect of the invention.

The light source section 111 includes a light source formed of a xenon lamp, an ultrahigh-pressure mercury lamp, an LED (light emitting diode), a laser light source, or any other high-luminance light source. The light source section 111 may include a reflector and an auxiliary reflector that guide light emitted from the light source to the light modulator 112. The light source section 111 may further include a lens group (not shown) and a polarizer for enhancing the optical characteristics of projected light.

A light source driver 121 is connected to the light source section 111. The light source driver 121 is connected to an internal bus 180 and controls power supplied to the light source section 111 to turn on and off the light source in the light source section 111 under the control of a control section 250, which is also connected to the internal bus 180.

The light outputted from the light source section 111 is separated by an optical system, such as dichroic mirrors (not shown), into R, G, and B color components, which are the three primary colors of light, and the color components are incident on the light modulator 112.

The light modulator 112 includes three liquid crystal panels (none of them is shown) corresponding to the R, G, and B color components. Each of the three liquid crystal panels has a configuration in which a liquid crystal material is encapsulated between a pair of transparent substrates. Each of the liquid crystal panels has a rectangular pixel area in which a plurality of pixels (not shown) are arranged in a matrix, and drive voltage is applicable to the liquid crystal material on a pixel basis.

A light modulator driver 122, which drives each of the liquid crystal panels, is connected to the light modulator 112. The light modulator driver 122 is connected to the internal bus 180.

The light modulator driver 122 receives, as an input from the image processing section 203, which will be described later, image data sets separated from one another in terms of the three primary colors or R, G, and B. The light modulator driver 122 converts each of the inputted color image data sets into a data signal suitable for the operation of the corresponding liquid crystal panel. The light modulator driver 122 applies drive voltage according to the converted data signal to each pixel of the corresponding liquid crystal panel to draw an image in the liquid crystal panel. The light outputted from the light source section 111 is thus modulated to form image light according to the image data.

The projection system 113 is attached to a projector main body 101 (main body section) so as to be attachable thereto and detachable therefrom. The projection system 113 includes a projection lens 1132 (see FIG. 3) and projects the modulated image light from the light modulator 112 on the screen SC. The projection lens 1132 is an optical part provided in the projection system 113 and includes a zoom lens that enlarges and reduces a projected image, a focus lens that adjusts focusing, and a plurality of other lens groups. The projection lens 1132 corresponds to the "lens" in an aspect of the invention.

A projection system driver 123 is connected to the projection system 113. The projection system driver 123 is connected to the internal bus 180. The projection system driver 123 corresponds to the "lens driver" in an aspect of the invention.

The projection system driver 123 drives a motor (motor 1131 shown in FIG. 4, for example) under the control of the control section 250 to not only adjust the positions of the lens groups provided in the projection lens 1132 for zoom adjustment and focus adjustment but also perform, for example, lens shift adjustment in which the position of the projection lens 1132 with respect to the projector main body 101 is adjusted.

The projector 100 includes a first switch 125 and a second switch 127. In the following sections, a switch is written as SW. The first SW 125 and the second SW 127 detect whether the projection system 113 including the projection lens 1132 is attached to the projector main body 101.

Each of the first SW 125 and the second SW 127 is formed, for example, of a mechanical switch having a fixed contact and a movable contact. Each of the first SW 125 and the second SW 127 has, as the state of the switch, an ON state in which the movable contact is in contact with the fixed contact and an OFF state in which a space is present between the movable contact and the fixed contact.

For example, each of the first SW 125 and the second SW 127 takes the ON state in the state in which the projection system 113 is attached to the projector main body 101 and takes the OFF state in the state in which the projection system 113 is detached from the projector main body 101.

Figure 3:
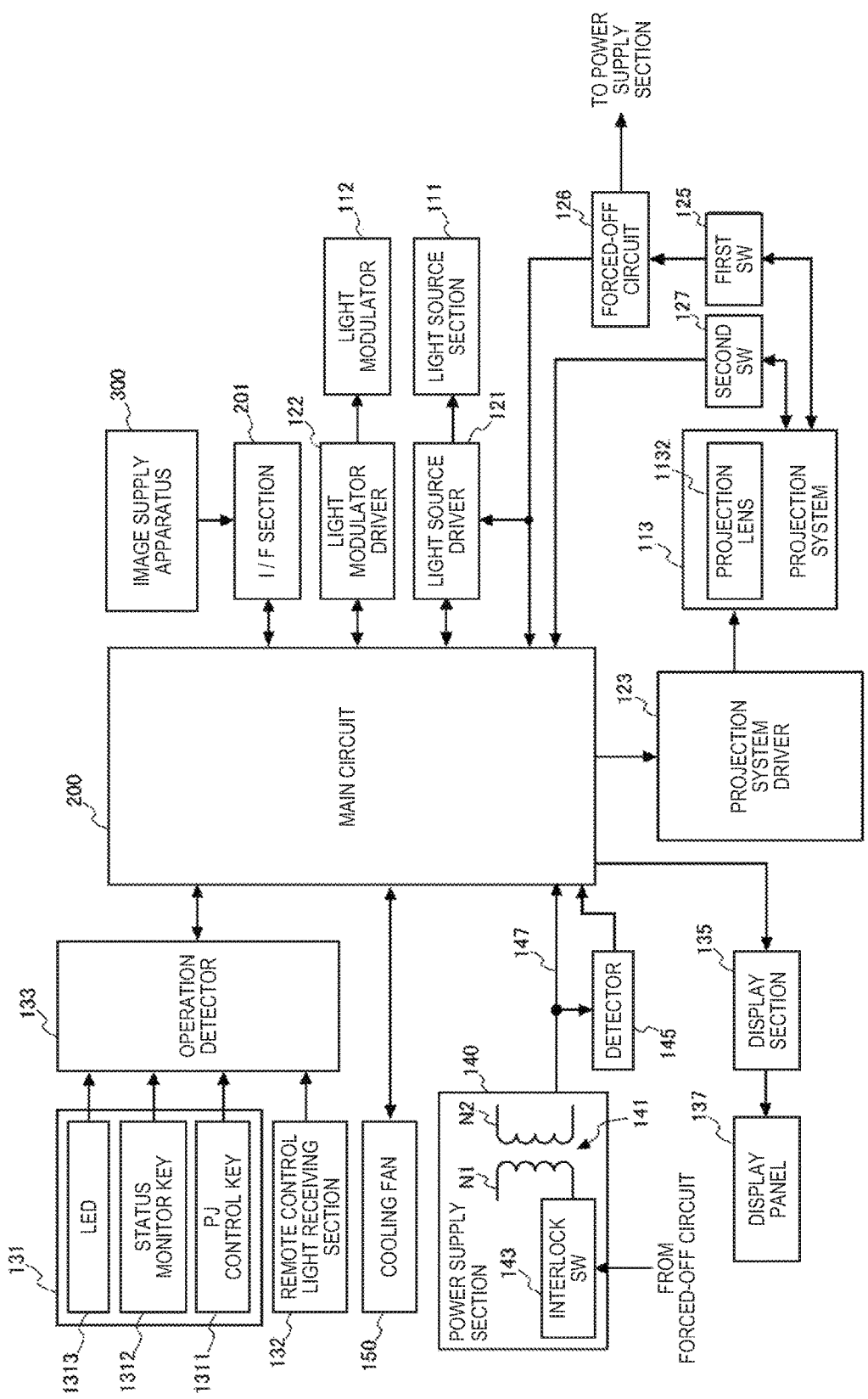
FIG. 3 shows the hardware configuration of the projector.

The output from the first SW 125 is connected to a forced-off circuit 126 shown in FIG. 3. In FIG. 1, the forced-off circuit 126 and a signal line that connects the first SW 125 to the forced-off circuit 126 are omitted.

When the state of the first SW 125 changes from the ON state to the OFF state, the voltage level of the signal outputted to the forced-off circuit 126 changes. Similarly, when the state of the second SW 127 changes from the ON state to the OFF state, the voltage level of a signal outputted to the control section 250 changes.

As another configuration of the first SW 125, when the state of the first SW 125 changes from the ON state to the OFF state, the first SW 125 may output a predetermined signal to the forced-off circuit 126, and when the state of the first SW 125 changes from the OFF state to the ON state, the first SW 125 may output no signal. The same holds true for the second SW 127.

The present embodiment is described with reference to the case where a mechanical switch is used as each of the first SW 125 and the second SW 127, but each of the first SW 125 and the second SW 127 is not limited to a mechanical switch. For example, a Hall switch, a micro switch, or any other switch can instead be used as each of the first SW 125 and the second SW 127.

An operation panel 131 is mounted on the projector main body 101 and includes a variety of switches and indictor lamps that allows a user to operate the projector 100, an LED 1313 (see FIG. 3), which displays the state of the projector 100, and other components.

The operation panel 131 is connected to an operation detector 133. The operation detector 133 causes the indicator lamps on the operation panel 131 to illuminate or blink as appropriate in accordance with the operation state and setting state of the projector 100 under the control of the control section 250. When a switch on the operation panel 131 is operated, an operation signal corresponding to the operated switch is outputted from the operation detector 133 to the control section 250.

The operation panel 131 and the operation detector 133 correspond to the "operation accepting section" in an aspect of the invention.

The projector 100 includes a remote control 5 used by the user. The remote control 5 has a variety of buttons and transmits an infrared signal in response to operation performed on any of the buttons. A remote control light receiving section 132, which receives the infrared signal issued from the remote control 5, is mounted on the projector main body 101. The remote control light receiving section 132 decodes the infrared signal received from the remote control 5, produces an operation signal representing the content of the operation performed on the remote control 5, and outputs the operation signal to the control section 250.

The remote control 5 corresponds to the "operation accepting section" in an aspect of the invention.

The projector 100 includes a display section 135 and a display panel 137.

The display section 135 develops, in a buffer (not shown), image data on an image to be displayed on the display panel 137 and drives a variety of drive circuits (not shown) on the basis of the developed image data to display the image based on the image data in the display panel 137. The display panel 137 can, for example, be a transmissive, reflective, or semi-transmissive liquid crystal display panel or an organic EL display panel based, for example, on an OLED (organic light emitting diode) or OEL (organic electro-luminescence).

The projector 100 includes a power supply section 140.

The power supply section 140 rectifies and smoothens AC voltage inputted from a commercial power supply, converts the resultant AC voltage into DC voltage, further converts the converted DC voltage into power via a transformer 141 (see FIG. 3), a switching device, and other components (none of them is shown), and supplies each portion of the projector 100 with the power.

The power supply section 140 includes an interlock SW 143. The interlock SW 143 is provided on one side of the transformer 141 having a primary winding N1 and a secondary winding N2 or the side facing the primary winding N1 (see FIG. 3). The interlock SW 143 is turned off when a forced-off signal is inputted from the forced-off circuit 126 shown in FIG. 3. When the interlock SW 143 is turned off, the supply of the DC voltage to the transformer 141 is terminated.

The projector 100 includes a wireless communication section 214. The wireless communication section 214 is connected to the internal bus 180. The wireless communication section 214 includes an antenna, an RF (radio frequency) circuit, and other components that are not shown and performs wireless communication with an external apparatus under the control of the control section 250. The wireless communication scheme employed by the wireless communication section 214 can, for example, be a short-range wireless communication scheme, such as a wireless LAN (local area network), Bluetooth (registered trademark), UWB (ultra-wide band), and infrared communication, or a wireless communication scheme using a mobile phone line.

The projector 100 includes a cooling fan 150. The cooling fan 150 delivers cooling air to the light source section 111 to cool the light source section 111 and internal parts that form the projector 100 under the control of the control section 250.

In FIG. 1, a control signal line that connects the cooling fan 150 to the control section 250 is omitted.

The image processing system of the projector 100 is primarily formed of the control section 250, which controls the projector 100, and further includes the image processing section 203, a frame memory 205, and a storage section 207. The control section 250, the image processing section 203, and the storage section 207 are connected to the internal bus 180.

The image processing section 203 identifies the attribute of the image data inputted from the I/F section 201 under the control of the control section 250. For example, the image processing section 203 identifies the image size and resolution of the image data, determines whether the image data contains a 2D (planar) image or a 3D (stereoscopic) image, determines whether the image data contains still images or motion images, and identifies the frame rate of the image data. The image processing section 203 writes the image data in the frame memory 205 on a frame basis and performs image processing on the written images.

Examples of the image processing performed by the image processing section 203 include a resolution conversion (scaling) process, a frame rate conversion process, a shape correction process, a zooming process, a color tone correction process, a luminance correction process, and a gamma correction process. A plurality of the processes described above can, of course, be combined with one another and carried out.

The resolution conversion process is a process in which the image processing section 203 converts the resolution of the image data in accordance with the resolution specified by the control section 250, for example, display resolution of the liquid crystal panels of the light modulator 112.

The frame rate conversion process is a process in which the image processing section 203 converts the frame rate of the image data into a frame rate specified by the control section 250.

The shape correction process is a process in which the image processing section 203 converts the image data in accordance with a correction parameter inputted from the control section 250 to correct the shape of an image projected on the screen SC.

The zooming process is a process in which the image processing section 203 enlarges or reduces an image when operation performed on the remote control 5 or the operation panel 131 instructs zooming.

The color tone correction process is the process of converting the color tone of the image data, and the image processing section 203 changes pixel data contained in the image data in accordance with a color tone specified by the control section 250. In the color tone correction process, the projector 100 can achieve, for example, a color tone suitable for movie viewing, a color tone suitable for a case where the screen SC is installed in a bright environment, and a color tone suitable for a case where projection is performed on a blackboard or any other non-white screen SC. In addition to the color tone correction process, contrast adjustment may, for example, be performed.

The luminance correction process is a process in which the image processing section 203 corrects the luminance of the image data. The luminance correction process corrects the luminance of the image data to luminance corresponding to the light emission state of the light source section 111, the brightness in the environment in which the projector 100 is installed, or any other factor.

The gamma correction process is the process of correcting externally supplied image data in accordance with the output characteristic of an output device, such as the light modulator 112. In general, since an output device has a nonlinear output characteristic, an image outputted at an output level proportional to the image data (level of drive voltage signal or drive current signal, for example) does not result in an outputted image having a desired color tone. An image having a desired color tone can be outputted by correction of the image data in accordance with the output characteristic of an output device.

The content and parameter of each of the above-mentioned processes carried out by the image processing section 203 and the points of time when the process is initiated and completed are controlled by the control section 250.

The image processing section 203 reads the processed image data from the frame memory 205, separates the image data into R, G, and B image data sets corresponding to the R, G, and B three primary colors, and outputs the image data sets to the light modulator driver 122.

The storage section 207 is formed of a flash ROM, an EEPROM (electrically erasable programmable read-only memory), or any other nonvolatile memory. The storage section 207 stores data to be processed by the control section 250 and a control program executed by the control section 205 in a nonvolatile manner.

The control section 250 includes a CPU (central processing unit), a ROM (read only memory), a RAM (random access memory), and other types of hardware (none of them is shown) and synthetically controls each portion of the projector 100. The ROM is a nonvolatile storage device and stores a control program and data. The RAM forms a work area for the CPU. The CPU develops the control programs read from the ROM and the storage section 207 in the RAM and executes the developed control programs to control each portion of the projector 100.

The control section 250 includes a projection control section 251, a lens shift control section 252, and a shutdown control section 253 as functional blocks. The functional blocks are achieved when the CPU executes the control programs stored in the ROM and the storage section 207.

The projection control section 251 controls the image processing section 203 to cause it to draw an image in the frame memory 205 on the basis of the image data supplied from the image supply apparatus 300 via the I/F section 201. The projection control section 251 further controls the light modulator driver 122 to cause it to draw the image drawn in the frame memory 205 in each of the liquid crystal panels of the light modulator 112. The images drawn in the liquid crystal panels of the light modulator 112 are projected through the projection system 113 on the screen SC.

The lens shift control section 252 controls the projection system driver 123. When the operation panel 131 is so operated that the projection system 113 is instructed to be driven in an arbitrary one direction, the lens shift control section 252 calculates an amount by which a motor corresponding to the instruction (motor provided in lens shift mechanism 102) is driven. The lens shift control section 252 outputs a drive signal containing the calculated amount of drive operation to the projection system driver 123.

The shutdown control section 253 carries out a shutdown process to power off the projector 100.

The shutdown control section 253 carries out the shutdown process to power off the projector 100 when a power off switch provided on the remote control 5 or the operation panel 131 is pressed down or when the voltage level of the signal inputted from the second SW 127 changes.

The shutdown process is carried out in the following procedure: First, in a case where a process is being carried out, the shutdown control section 253 terminates the process being carried out. The shutdown control section 253 then stores data stored in a volatile memory, such as the RAM, in the storage section 207. Finally, the shutdown control section 253 controls the power supply section 140 to cause it to instruct the power supply section 140 to stop supplying power so that the projector 100 is powered off.

The shutdown control section 253, when the forced-off signal is inputted thereto from the forced-off circuit 126, stops the cooling fan 150 and controls the projection system driver 123 to cause it to stop the motor provided in the lens shift mechanism 102 and the motor 1131 provided in the projection system 113.

A power supply control section 254 controls a power supply control circuit 215 (see FIG. 5) to cause it to control the projector 100 in such a way that a power supply mode thereof has any of the following four states.

The power supply mode is a power-consumption-based state of the projector 100 and includes, for example, an operation mode and a standby mode. The operation mode is a mode in which power is supplied to pre-specified components that form the projector 100, and the standby mode is a mode in which power is supplied to fewer components than the components to which power is supplied in the operation mode so that the power consumption is suppressed as compared with that in the operation mode.

The power supply mode may be changed when the operation panel 131 or the remote control 5 accepts the user's operation or may be changed by the power supply control section 254 in accordance with the status of the projector 100.

FIG. 2 shows the power supply modes provided in the projector 100.

The projector 100 has the following four power supply modes: an operation mode; a first standby mode (AV (audio visual) standby) mode; a second standby (network standby) mode; and a third standby (deep standby) mode. The operation mode corresponds to the "first power supply mode" in an aspect of the invention. The first standby mode corresponds to the "second power supply mode" in an aspect of the invention. The second and third standby modes correspond to the "third power supply mode" in an aspect of the invention.

The operation mode is a power supply mode in which power is supplied to the light source section 111 and the light source driver 121 so that the light source section 111 can output light. The first to third standby modes are power supply modes in which the power supply to the light source section 111 and the light source driver 121 is terminated.

Power consumption of the projector 100 in the case where the power supply mode is the operation mode is higher than power consumption of the projector 100 in the case where the power supply mode is any of the first to third standby modes.

Power consumption of the projector 100 in the case where the power supply mode is the third standby mode is the lowest of all the power supply modes, and power consumption of the projector 100 in the case where the power supply mode is the second standby mode is higher than the power consumption in the third standby mode but lower than the other two modes. In the case where the power supply mode is the first standby mode, power consumption of the projector 100 is higher than that in the second standby mode but lower than that in the operation mode.

In the projector 100, when the power supply mode is the operation mode, the light source in the light source section 111 and the cooling fan 150 for cooling the light source are in operation. When the power supply mode is the operation mode, the network communication function is enabled, and the projector 100 can therefore process an image signal and a voice signal supplied from the image supply apparatus 300. Further, when the power supply mode is the operation mode, zooming adjustment, focusing adjustment, and other types of lens control can be performed, and the lens shift control can further be performed. Moreover, when the power supply mode is the operation mode, the LED 1313 provided on the operation panel 131 illuminates.

The LED 1313 provided on the operation panel 131 corresponds to the "notification section" in an aspect of the invention.

In the projector 100, when the power supply mode is the first standby mode, the light source in the light source section 111 and the cooling fan 150 for cooling the light source are not in operation. When the power supply mode is the first standby mode, the network communication function is enabled, and the projector 100 can therefore process part of an image signal and a voice signal supplied from the image supply apparatus 300. Further, when the power supply mode is the first standby mode, the zooming adjustment, the focusing adjustment, or other types of lens control cannot be performed, but the lens shift control can be performed. That is, when the power supply mode is the first standby mode, power is supplied to the projection system driver 123 and the lens shift mechanism 102 (see FIG. 4), and the projection lens 1132 (see FIG. 3) can therefore be moved.

Further, when the power supply mode is the first standby mode, power is supplied to the operation panel 131, the remote control light receiving section 132, the operation detector 133, the display panel 137, and the display section 135, and the LED 1313 takes a state different from the state in the operation mode, for example, a blinking state.

In the projector 100, when the power supply mode is the second standby mode, the light source in the light source section 111 and the cooling fan 150 for cooling the light source are not in operation. When the power supply mode is the second standby mode, the network communication function is enabled, but the projector 100 cannot process an image signal or a voice signal supplied from the image supply apparatus 300. That is, when the power supply mode is the second standby mode, the projector 100 can receive a command, such as PING, transmitted from an external apparatus and transmit a response to the received PING command to the external apparatus. Further, when the power supply mode is the second standby mode, the zooming adjustment, the focusing adjustment, or other types of lens control or the lens shift control cannot be performed. Moreover, when the power supply mode is the second standby mode, power is supplied to the operation panel 131, the remote control light receiving section 132, the operation detector 133, the display panel 137, and the display section 135, but the LED 1313 takes a state different from the state in the first standby mode, for example, a non-illuminating state.

In the projector 100, when the power supply mode is the third standby mode, the light source in the light source section 111 and the cooling fan 150 for cooling the light source are not in operation.

When the power supply mode is the third standby mode, the network communication function is disabled, and the projector 100 cannot process an image signal or a voice signal. Further, when the power supply mode is the third standby mode, the zooming adjustment, the focusing adjustment, or other types of lens control or the lens shift control cannot be performed. Moreover, when the power supply mode is the third standby mode, no power is supplied to the operation panel 131, the remote control light receiving section 132, the operation detector 133, the display panel 137, or the display section 135, and the LED 1313 takes a state different from the state in the first standby mode, for example, the non-illuminating state.

The LED 1313 provided on the operation panel 131 illuminates when the power supply mode of the projector 100 has the operation state, blinks when the power supply mode has the first standby state, and does not illuminate when the power supply mode has the second or third standby state.

The LED 1313 therefore allows the user to recognize whether the power supply mode of the projector 100 has the operation state, the first standby state, or the second or third standby state.

In the present embodiment, the case where the power supply mode of the projector 100 is displayed by using the LED 1313, but another method may be used to notify the user of the power supply mode. For example, the current power supply mode may be displayed on the display panel 137 in the form of letters, or the pattern in accordance with which the LED 1313 blinks may be changed in accordance with the power supply mode. That is, any notification approach or method that allows the user to visually identify the power supply mode may be employed.

FIG. 3 shows the hardware configuration of the projector 100.

The output from the first SW 125 is connected to the forced-off circuit 126.

The forced-off circuit 126 detects a change in the voltage level of the signal inputted from the first SW 125 and outputs the forced-off signal to the light source driver 121, the power supply section 140, and the control section 250. The forced-off circuit 126 outputs the forced-off signal to the light source driver 121, the power supply section 140, and the control section 250, for example, when the voltage level of the signal inputted from the first SW 125 changes from a high level to a low level.

The light source driver 121 to which the forced-off signal has been inputted stops power supply to the light source section 111 and turns off the light source in the light source section 111.

Figure 5:
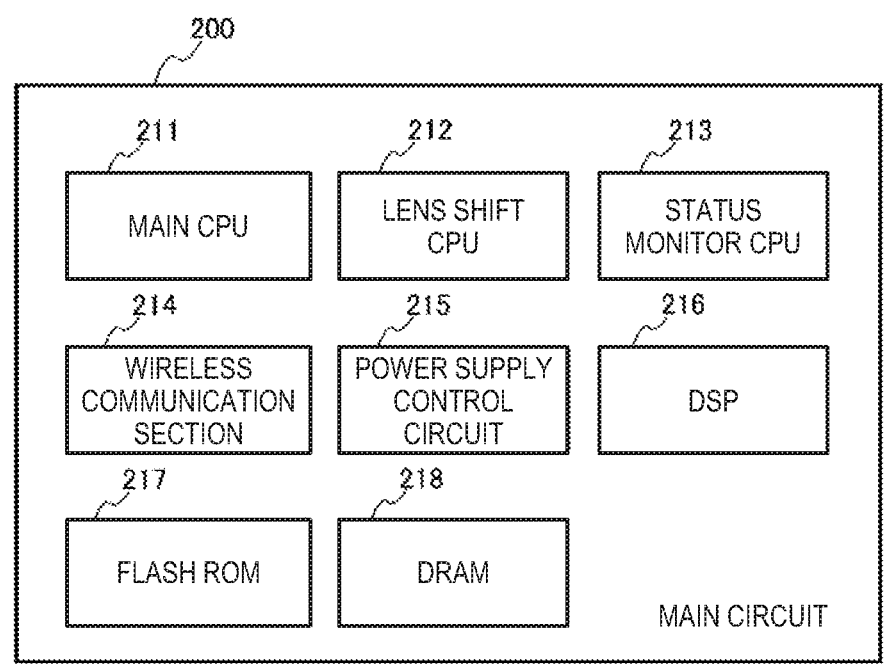
FIG. 5 is a block diagram of a main circuit.

The shutdown control section 253 of the control section 250, when the forced-off signal is inputted thereto from the forced-off circuit 126, controls the power supply control circuit 215 shown in FIG. 5 to cause it to stop supplying the cooling fan 150 with power to turn off the cooling fan 150.

Further, the interlock SW 143 of the power supply section 140, when the forced-off signal is inputted thereto from the forced-off circuit 126, changes its state from ON to OFF. When the interlock SW 143 is turned off, the DC voltage supply to the transformer 141 is terminated. As a result, the power supply section 140 stops outputting the DC voltage and therefore stops supplying power to the portions that form the projector 100.

Operation keys provided on the operation panel 131 include a projector control key (written as PJ control key) 1311 and a status monitor key 1312.

The PJ control key 1311 is formed, for example, of a "power key" for powering on and off the projector 100, a "menu key" for displaying a menu image for a variety of settings, a "cursor key" used to select or otherwise indicates an item in the menu image, a "finalization key" for finalizing a selected item, a "cancel key" used to cancel or otherwise discards operation, and an "input source switch key" for switching an input source (source that supplies image signal) to another.

The status monitor key 1312 is a key for displaying the status of the projector 100 on the display panel 137.

The LED 1313 is provided on the operation panel 131. The LED 1313 illuminates, blinks, or does not illuminate in accordance with the power supply mode of the projector 100 under the control of the control section 250.

A power supply line 147, via which the power supply section 140 supplies a main circuit 200 with power, is provided with a detector 145. The detector 145 detects voltage across the power supply line 147. When the interlock SW 143 terminates the supply of the DC voltage to the transformer, the voltage across the power supply line 147 decreases. The detector 145 outputs a result of the detection of the voltage across the power supply line 147 to a status monitor CPU 213 shown in FIG. 5. The status monitor CPU 213 generates image data representing the result of the detection performed by the detector 145 and outputs the image data to the display section 135, which displays the image data on the display panel 137.

Figure 4:
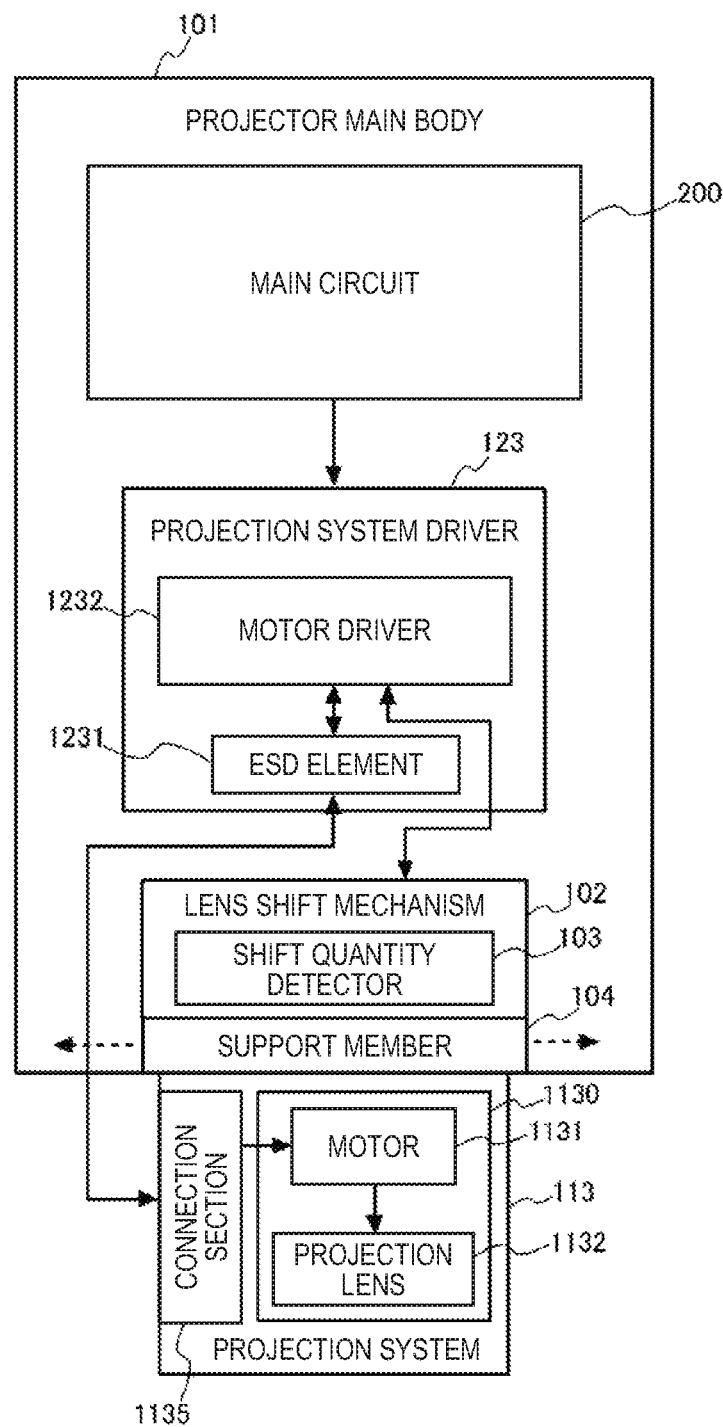
FIG. 4 shows connection between the projector and a projection system.

FIG. 4 shows connection between the projector and the projection system.

In the projector main body 101 are provided the projection system driver 123, the lens shift mechanism 102, and a support member 104.

The projection system driver 123 includes an ESD (electro-static discharge) element 1231 and a motor driver 1232. The ESD element 1231 corresponds to the "protection element" in an aspect of the invention.

The ESD element 1231 absorbs static electricity to protect the motor driver 1232, the motor 1131 incorporated in the projection system 113 and used for zooming adjustment and focusing adjustment, and other motors from static electricity.

The motor driver 1232 is connected to the projection system 113 via the ESD element 1231 and supplies the motor 1131, which is incorporated in the projection system 113 and used for zooming adjustment and focusing adjustment, with drive current to drive the motor 1131 to rotate under the control of the control section 250. The motor driver 1232 further supplies the motor in the lens shift mechanism 102 with drive current to drive the motor to rotate under the control of the control section 250.

The lens shift mechanism 102 includes a motor and a gear (neither of them is shown) as a drive mechanism that moves the position of the support member 104 in the projector main body 101 in the upward/downward direction and the rightward/leftward direction.

The drive current and drive signal supplied from the motor driver 1232 drive the motor in the lens shift mechanism 102, and the thus driven motor moves the position of the support member 104 in the projector main body 101 in the upward/downward direction and the rightward/leftward direction. As a result, the position of the projection system 113 supported by the support member 104 is moved in the upward/downward direction and the rightward/leftward direction, and the projection lens 1132 is moved (shifted) in the upward/downward and rightward/leftward directions in a plane perpendicular to the optical axis of the projection lens 1132.

The lens shift mechanism 102 includes a shift quantity detector 103. The shift quantity detector 103 detects the amount of movement by which the lens shift mechanism 102 moves the projection lens 1132 in a lens shift process. The amount of movement contains the direction in which the projection lens 1132 is moved by the lens shift mechanism 102 and the travel in the direction. The travel is information representing the distance from a home position that is a preset reference position of the projection lens 1132 (attachment/detachment position) to the current position of the projection lens 1132. In the present embodiment, a stepper motor is used as the motor provided in the lens shift mechanism 102, and the amount of movement is detected on the basis of the number of steps by which the stepper motor is driven. Instead, the lens shift mechanism 102 may be provided with an encoder (not shown), and the encoder may be used to detect the travel.

The shift quantity detector 103 outputs the detected amount of movement of the projection lens 1132 to the lens shift control section 252. The lens shift control section 252 stores the amount of movement detected by the shift quantity detection section 103 in the RAM.

The support member 104 is provided as part of the projector main body 101 and supports the projection system 113. The projection system 113 supported by the support member 104 can be detached from the support member 104.

The support member 104 is driven with the motor and the gear in the lens shift mechanism 102, and the position of the support member 104 in the projector main body 101 is moved in the upward/downward and rightward/leftward directions. The thus driven motor and gear, which move the projection lens 1132 in the projection system 113, serve as a lens shift mechanism.

The projection system 113 includes a lens block 1130 and a connection section 1135. The lens block 1130 includes the motor 1131 and the projection lens 1132. The motor 1131 drives the projection lens 1132 to move the projection lens 1132 for zooming and focusing adjustment.

The connection section 1135 includes a connector that is not shown and is electrically connected to a connector (not shown) provided as part of the projector main body 101 when the projection system 113 is attached to the projector main body 101.

The connection section 1135 is further connected to the motor 1131 and electrically connects the projection system driver 123 to the motor 1131 when the projection system 113 is attached to the projector main body 101. At this point, since the projection system driver 123 is connected to the motor 1131 via the ESD element 1231, the ESD element 1231 absorbs static electricity, whereby the motor driver 1232 and the motor 1131 are protected from static electricity.

FIG. 5 is a block diagram of the main circuit 200.

The main circuit 200 incorporates a main CPU 211, a lens shift CPU 212, the status monitor CPU 213, the wireless communication section 214, the power supply control circuit 215, a DSP (digital signal processor) 216, a flash ROM 217, a DRAM 218, and other components.

The main CPU 211, the lens shift CPU 212, and the status monitor CPU 213 function as the control section 250 shown in FIG. 1.

The main CPU 211 synthetically controls the overall projector 100. The main CPU 211, when it executes a control program stored in the flash ROM 217, functions as the projection control section 251 and the shutdown control section 253 shown in FIG. 1.

The lens shift CPU 212 controls the projection system driver 123 to shift the projection lens 1132.

The lens shift CPU 212, when it executes the control program stored in the flash ROM 217, functions as the lens shift control section 252 shown in FIG. 1.

The status monitor CPU 213 transmits a status request command to the main CPU 211 and acquires information on the status of the projector 100 when the status monitor key 1312 is operated and an operation signal corresponding to the operation is inputted via the operation detector 133. The status monitor CPU 213 outputs the acquired status information to the display section 135, which displays the status information on the display panel 137.

The power supply control circuit 215 supplies each portion of the projector 100 with power under the control of the control section 250 (power supply control section 254). The power supply control circuit 215 produces power for an internal logic circuit from power supply voltage produced by the power supply section 140 and supplies each portion of the main circuit 200 with the produced power. The power supply control circuit 215 further supplies each portion of the projector 100 excluding the main circuit 200 with the power supply voltage produced by the power supply section 140.

The DSP 216 functions as the image processing section 203 shown in FIG. 1. The flash ROM 217 functions as the storage section 207 shown in FIG. 1. The DRAM 218 functions as the frame memory 205 shown in FIG. 1.

The projector 100 has the plurality of power supply modes in order to lower power consumption. When the projector 100 transitions to a power supply mode for lowering the power consumption, the projection lens 1132 cannot be moved in some cases, and in a case where the projection lens 1132 is not located in the attachable/detachable position, where the projection lens 1132 can be attached and detached, the projection lens 1132 cannot be detached from the projector main body 101. In this case, to detach the projection lens 1132 from the projector main body 101, the projector 100 needs to be restarted.

In view of the fact described above, in the present embodiment, when the power supply mode has the first standby state, the power supply control section 254 causes the power supply control circuit 215 to supply the projection system driver 123 with power to achieve a state in which lens shift operation of moving the position of the projection lens 1132 can be performed.

Further, the lens shift control section 252, when it accepts an instruction of execution of a lens movement process from the user, detects the current position of the projection lens 1132 and calculates the amount by which the motor for moving the projection lens 1132 to the home position (motor in lens shift mechanism 102) is driven. The lens shift control section 252 then uses the calculated amount of drive operation to drive the motor in the lens shift mechanism 102 to shift the projection lens 1132 to the home position, which is the attachment/detachment position.

The lens movement process is the process of moving the projection lens 1132 to the home position, which is the attachment/detachment position, and causing the power supply control section 254 to terminate power supply to the projection system driver 123.

Figure 6:
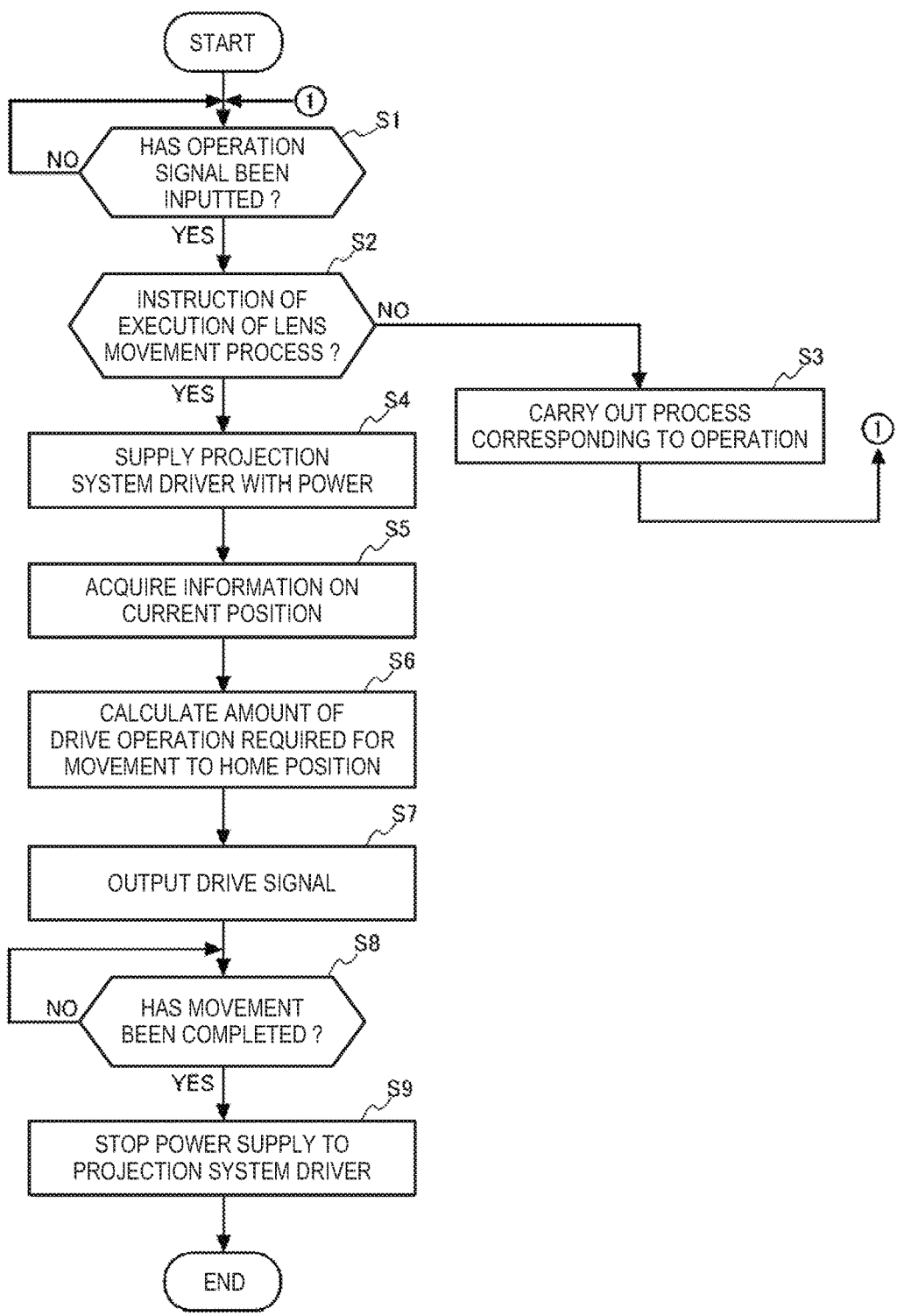
FIG. 6 is a flowchart showing the action of the projector.

FIG. 6 is a flowchart showing the action of the projector 100.

The flowchart contains processes carried out when the power supply mode of the projector 100 is the first standby mode.

The control section 250 first evaluates whether or not the operation panel 131 or the remote control 5 has been operated and an operation signal corresponding to the operation performed on the operation panel 131 or the remote control 5 has been inputted via the operation detector 133 (step S1). When the evaluation results in negation (step S1/NO), the control section 250 waits until an operation signal is inputted.

When the evaluation results in affirmation (step S1/YES), the control section 250 evaluates whether or not the inputted operation signal is a signal that instructs execution of the lens movement process (step S2). When the evaluation results in negation (step S2/NO), the control section 250 carries out a process corresponding to the inputted operation signal (step S3) and returns to the evaluation in step S1.

When the evaluation in step S2 results in an instruction of execution of the lens movement process (step S2/YES), the lens shift control section 252 of the control section 250 first causes the power supply control section 254 to control the power supply control circuit 215 to cause it to supply the projection system driver 123 with power (step S4).

The lens shift control section 252 then acquires information on the current position of the projection lens 1132 stored in the RAM (step S5).

The lens shift control section 252 then calculates, on the basis of the acquired information on the current position, the amount by which the motor for moving the projection lens 1132 from the current position to the home position is driven (step S6). The lens shift control section 252 produces a drive signal containing information on the calculated amount of drive operation and outputs the drive signal to the motor driver 1232 of the projection system driver 123 (step S7). The motor driver 1232 drives the motor in the lens shift mechanism 102 in accordance with the drive signal inputted from the lens shift control section 252.

The lens shift control section 252 causes the shift quantity detector 103 to detect the amount of movement and evaluates whether or not the projection lens 1132 has returned to the home position on the basis of the detected amount of movement and the movement of the projection lens 1132 has therefore been completed (step S8). When the evaluation results in negation (step S8/NO), the lens shift control section 252 continues to acquire the amount of movement from the shift quantity detector 103 and evaluates whether or not the movement of the projection lens 1132 to the home position has been completed (step S8). When the evaluation results in affirmation (step S8/YES), the lens shift control section 252 instructs the power supply control section 254 to transition to the second standby state.

The power supply control section 254 having received the instruction from the lens shift control section 252 controls the power supply control circuit 215 to cause it to stop the power supply to the projection system driver 123 (step S9).

As described above, in the present embodiment, the projection lens 1132 can be moved to the home position when the power supply mode of the projector 100 has the first standby state. Further, since the power supply to the light source section 111 and the projection system driver 123 is terminated, the projection lens 1132 can be safely changed.

After the process in step S9, the power supply control section 254 may stop the power supply to the image processing section 203, the I/F section 201, and the wireless communication section 214 to disable the image data processing and the network communication function so that the state of the projector 100 transitions to the third standby state. Further, the power supply control section 254 may instruct the shutdown control section 253 to carry out the shutdown process to power off the projector 100.

The user can then change the projection lens 1132 more safely.

In the evaluation in steps S1 and S2 shown in FIG. 6, the control section 250 may, for example, evaluate whether or not an operation signal has been inputted continuously for a predetermined period and the inputted operation signal is a signal that instructs execution of the lens movement process. That is, the control section 250 evaluates whether or not the user has pressed down a switch (operation element) that instructs execution of the lens movement process continuously for a predetermined period. Unintended movement of the projection lens 1132 can thus be avoided if the switch is accidentally pressed down.

As described above, the embodiment of the projector and the method for controlling the projector to which the invention is applied includes the power supply control section 254, which controls power supply, the projection lens 1132, which projects an image, and the projection system driver 123, which moves the projection lens 1132.

The power supply control section 254, which controls the power supply control circuit 215, performs, as a power supply mode, the operation mode, in which power is supplied to the light source section 111 to allow the light source section 111 to output light, and the first standby mode, in which the power supply to the light source is terminated.

Further, in the first standby mode, the power supply control section 254 supplies the projection system driver 123 with power to allow the projection lens 1132 to move to the attachment/detachment position, where the projection lens 1132 can be attached and detached.

Therefore, even in a power supply mode for lowering the power consumption of the projector 100, the lens can be quickly changed.

Further, the projector 100 carries out the lens movement process of causing the projection system driver 123 to move the projection lens 1132 to the home position and causing the power supply control section 254 to terminate the power supply from the power supply section 140.

The projection lens 1132 can therefore be safely changed.

Further, in the lens movement process, the power supply to the projection system driver 123 or the power supply to the projector 100 is terminated.

The projection lens 1132 can therefore be more safely changed.

The projector 100 includes the operation panel 131 or the remote control 5, which accepts the user's operation. In the lens movement process, when predetermined operation is accepted with the operation panel 131 or the remote control 5, the projector 100 causes the projection system driver 123 to move the projection lens 1132 to the home position.

The lens movement process can therefore be initiated in response to the user's operation.

When operation performed for at least preset period on a switch or a button provided on the operation panel 131 or the remote control 5 is detected, the projection system driver 123 moves the projection lens 1132 to the home position.

Therefore, if the switch or the button is accidentally pressed down, the projection lens 1132 is not allowed to move.

The projection system 113 includes the lens block 1130, which includes the projection lens 1132 and the motor 1131, which moves the projection lens 1132 for zooming and focusing adjustment. The projector main body 101 includes the ESD element 1231, which protects the projection system driver 123 and the motor 1131 from static electricity, when the projection system 113 is connected to the projector main body 101 and the projection system driver 123 is electrically connected to the motor 1131. The projection system driver 123 and the motor 1131 can therefore be protected from static electricity.

The projector 100 has, as the power supply mode, the second and third standby modes, in which the power supply section 140 supplies the projection system driver 123 with no power. The operation panel 131 of the projector 100 is provided with the LED 1313, which illuminates or blinks in the second and third standby states in an aspect different from the aspect in the operation and first standby states. The LED 1313 can therefore notify the user of the power supply mode of the projector 100.

The embodiment described above is a preferable embodiment of the invention. The invention is, however, not limited thereto, and a variety of variations are conceivable to the extent that they do not depart from the substance of the invention.

For example, in the embodiment described above, when the operation panel 131 or the remote control 5 accepts the user's operation, the lens movement process is initiated. The lens movement process may instead be carried out when the power supply mode is changed from the operation state to the first standby state.

Further, when the projector 100 takes the operation state, and when the operation panel 131 or the remote control 5 accepts the user's operation of causing the power supply mode to transition to the first standby state, a message stating "Change projection lens?" is displayed on the screen SC. Thereafter, when the operation panel 131 or the remote control 5 accepts operation representing that the projection lens 1132 is changed, the power supply mode may be switched from the operation mode to the first standby mode, and the lens movement process may be carried out.

The above embodiment has been described with reference to the configuration in which three transmissive liquid crystal panels corresponding to the RGB three colors are used as the light modulator 112, which modulates the light emitted from the light source, but not necessarily in the invention. For example, a configuration in which three reflective liquid crystal panels are used or a method using a combination of one liquid crystal panel and a color wheel may be employed. Further, a method using three digital mirror devices (DMDs), a DMD method using a combination of one digital mirror device and a color wheel, or other methods may be employed. When only one liquid crystal panel or DMD is used as the light modulator, no member corresponding to a light combining system, such as a cross dichroic prism, is necessary. Further, any light modulator that can modulate light emitted from a light source can be employed with no problem instead of a liquid crystal panel or a DMD. Still further, a reflective liquid crystal display device, such as LCOS (Liquid Crystal on Silicon, LCoS is a registered trademark), may be used as the light modulator 112.

In the embodiment described above, a front-projection projector 100, which performs projection from the side in front of the screen SC, is presented as an example of the projector 100, but not necessarily in the invention.

Each of the functional portions shown in FIG. 1 represents a functional configuration and is not necessarily implemented in a specific form. That is, hardware corresponding to each of the functional portions is not necessarily implemented, and a single processor that executes a program can, of course, achieve the functions of the plurality of functional portions. Further, in the embodiment described above, part of the functions achieved by software in the embodiment described above may be achieved by hardware, or part of the functions achieved by hardware may be achieved by software. In addition, the specific detailed configuration of each of the other portions in the projector 100 can be arbitrarily changed to the extent that the change does not depart from the substance of the invention.

What is claimed is:

1. A projector comprising:
   a light source;
   a power supply section;
   a power supply control section that controls power supply from the power supply section and includes a first power supply mode and a second power supply mode, whereby the projector consumes less power in the second power supply mode than the first power supply mode;
   a projection lens that projects an image;
   a lens driver that moves the projection lens; and
   a lens shift control section that controls the lens driver,
   wherein the power supply control section performs (1) the first power supply mode in which power is supplied to the light source to allow the light source to emit light and (2) the second power supply mode in which the power supply to the light source is terminated, while power is supplied to the lens driver to allow the projection lens to move to an attachment/detachment position where the projection lens is attachable and detachable,
   a lens movement process of causing the lens driver to move the projection lens to the attachment/detachment position and causing the power supply control section to terminate the power supply from the power supply section is allowed to be carried out, and
   the lens shift control section (1) determines that the projection lens has returned to the attachment/detachment position in the lens movement process; and (2) in response to and based on the lens shift control section determining that the projection lens has returned to the attachment/detachment position, the lens shift control section instructs the power supply control section to terminate the power supply to the lens driver or the projector.

2. The projector according to claim 1,
   further comprising an operation accepting section that accepts operation,
   wherein when the operation accepting section accepts predetermined operation, the lens driver moves the projection lens to the attachment/detachment position.

3. The projector according to claim 2, wherein when operation performed for at least a preset period on an operation element provided on the operation accepting section is detected, the lens driver moves the projection lens to the attachment/detachment position.

4. The projector according to claim 1,
   wherein the projection lens is a lens block including a lens and a motor that moves the lens, and
   a main body of the projector includes a protection element that protects the lens driver and the motor from static electricity when the projection lens is attached to the main body and the lens driver is electrically connected to the motor.

5. The projector according to claim 1,
wherein the projector has a third power supply mode in which the power supply section supplies the lens driver with no power, and
the projector further comprises a notification section, and in the second power supply mode, the notification section performs notification different from notification performed in the first and third power supply modes.

6. The projector according to claim 1,
wherein the projector has a third power supply mode in which the power supply section supplies the lens driver with no power, whereby the projector consumes less power in the third power supply mode than the second power supply mode.

7. The projector according to claim 1,
wherein, in the first power supply mode, the power supply is supplied to the light source and the lens shift mechanism, while movement of the projection lens to the attachment/detachment position is allowed in the second power supply mode which is a standby mode.

8. A method for controlling a projector including a light source, a power supply section, a power supply control section that controls power supply from the power supply section and includes a first power supply mode and a second power supply mode, whereby the projector consumes less power in the second power supply mode than the first power supply mode, a projection lens that projects an image, a lens driver that moves the projection lens, and a lens shift control section that controls the lens driver, the method comprising:
  causing the power supply control section to change (1) the power supply mode to a first power supply mode in which power is supplied to the light source to allow the light source to emit light and (2) the second power supply mode in which the power supply to the light source is terminated; while
  causing the power supply control section to supply the lens driver with power to allow the projection lens to move to an attachment/detachment position where the projection lens is attachable and detachable, wherein:
  the lens driver is caused to move the projection lens to the attachment/detachment position and causing the power supply control section to terminate the power supply from the power supply section is allowed to be carried out, and
  the lens shift control section (1) determines that the projection lens has returned to the attachment/detachment position in the lens movement process; and (2) in response to and based on the lens shift control section determining that the projection lens has returned to the attachment/detachment position, the lens shift control section instructs the power supply control section to terminate the power supply to the lens driver or the projector.

* * * * *